(12) United States Patent
Wan et al.

(10) Patent No.: US 10,323,756 B2
(45) Date of Patent: Jun. 18, 2019

(54) MULTI-WAY VALVE

(71) Applicants: WUHU KING-BULL INFORTEC PETROLEUM EQUIPMENT CO., LTD., Anhui (CN); KELAMAYI KING-BULL INFORTEC PETROLEUM EQUIPMENT CO., LTD., Xinjiang (CN)

(72) Inventors: Mingmin Wan, Xinjiang (CN); Jianshe Yao, Xinjiang (CN); Zhi Gao, Xinjiang (CN); Xuefu Li, Xinjiang (CN); Yunzhao Chen, Anhui (CN)

(73) Assignees: WUHU KING-BULL INFORTEC PETROLEUM EQUIPMENT CO., LTD., Anhui (CN); KELAMAYI KING-BULL INFORTEC PETROLEUM EQUIPMENT CO., LTD., Xinjiang (CN)

( * ) Notice: Subject to any disclaimer, the term of this patent is extended or adjusted under 35 U.S.C. 154(b) by 0 days.

(21) Appl. No.: 15/549,051

(22) PCT Filed: Mar. 25, 2015

(86) PCT No.: PCT/CN2015/075044
§ 371 (c)(1),
(2) Date: Aug. 4, 2017

(87) PCT Pub. No.: WO2016/123845
PCT Pub. Date: Aug. 11, 2016

(65) Prior Publication Data
US 2018/0010698 A1    Jan. 11, 2018

(30) Foreign Application Priority Data
Feb. 4, 2015 (CN) .......................... 2015 1 0059233

(51) Int. Cl.
*F16K 5/18* (2006.01)
*F16K 11/085* (2006.01)
(Continued)

(52) U.S. Cl.
CPC .............. *F16K 5/181* (2013.01); *E21B 34/02* (2013.01); *F16K 11/074* (2013.01);
(Continued)

(58) Field of Classification Search
CPC ...... F16K 5/181; F16K 11/085; F16K 11/072; F16K 41/02; F16K 11/0743; F16K 11/074; F16K 11/0856; Y10T 137/86863
See application file for complete search history.

(56) References Cited

U.S. PATENT DOCUMENTS

| 2,996,083 A | 8/1961 | Huska |
| 4,328,832 A | 5/1982 | Inada et al. |

(Continued)

FOREIGN PATENT DOCUMENTS

| CN | 203036009 U | 7/2013 |
| CN | 103939641 A | 7/2014 |

(Continued)

OTHER PUBLICATIONS

International Preliminary Examination Report with Written Opinion for Application No. PCT/CN2015/075044 dated Nov. 10, 2015.
(Continued)

*Primary Examiner* — Matthew W Jellett
*Assistant Examiner* — Christopher D Ballman
(74) *Attorney, Agent, or Firm* — Jenkins, Wilson, Taylor & Hunt, P.A.

(57) ABSTRACT

A multi-way valve includes an upper valve body, a lower valve body and a rotary valve core. The upper valve body and the lower valve body are provided respectively with an upper mounting hole and a lower mounting hole. The rotary (Continued)

valve core is provided passing through the upper mounting hole and the lower mounting hole, respectively. The rotary valve core is formed with a first stepped surface facing toward the upper valve body, and an adjusting nut, which is located below the rotary valve core, is provided in the lower mounting hole. The rotary valve core is moved up and down axially by adjusting the adjusting nut such that an axial clearance between the first stepped surface and the upper valve body is adjusted, so the rotary valve core may flexibly rotate at different temperatures to prevent the multi-way valve from being stuck.

8 Claims, 3 Drawing Sheets

(51) Int. Cl.
*E21B 34/02* (2006.01)
*F16K 11/074* (2006.01)
*F16K 27/04* (2006.01)
*F16K 41/02* (2006.01)
*F16K 11/072* (2006.01)

(52) U.S. Cl.
CPC .......... *F16K 11/085* (2013.01); *F16K 27/045* (2013.01); *F16K 11/072* (2013.01); *F16K 11/0743* (2013.01); *F16K 11/0856* (2013.01); *F16K 41/02* (2013.01); *Y10T 137/86863* (2015.04)

(56) References Cited

U.S. PATENT DOCUMENTS

| | | | | |
|---|---|---|---|---|
| 4,821,772 | A * | 4/1989 | Anderson, Jr. | F16K 11/08 137/625.46 |
| 4,989,641 | A * | 2/1991 | Jones | F16K 11/085 137/625.11 |
| 5,549,138 | A * | 8/1996 | Eminger | F16K 11/0876 137/385 |
| 5,727,595 | A * | 3/1998 | Eminger | F16K 11/0876 137/876 |
| 5,727,596 | A * | 3/1998 | Eminger | F16K 11/0876 137/876 |
| 8,100,143 | B2 * | 1/2012 | Wan | E21B 34/02 137/625.11 |

FOREIGN PATENT DOCUMENTS

| | | |
|---|---|---|
| CN | 104613037 A | 5/2015 |
| CN | 204458610 U | 7/2015 |
| CN | 204493797 U | 7/2015 |

OTHER PUBLICATIONS

International Search Report for Application No. PCT/CN2015/075044 dated Nov. 10, 2015.

\* cited by examiner

MULTI-WAY VALVE

TECHNICAL FIELD

The present invention relates to a multi-way valve, particularly to a multi-way valve having an gap-adjustable double sealing structure for measuring in turn the production of an individual well of oil wells to obtain the dynamic production data of each oil well, and belongs to the field of oil and gas gathering and transporting system such as petroleum, chemical industry, and so on.

BACKGROUND OF THE INVENTION

In crude oil exploitation technology, especially in the experimental oil exploitation technology, a large amount of overheated steam is injected into the underground, making the temperature of produced oil liquid of an oil well very high (usually 210° C.-270° C.). Therefore, the device used for crude oil exploitation must meet the conditions of high temperature and high pressure. A Chinese Patent with an application number 201320031213.1 provides a multi-way valve for use in such a high temperature and high pressure environment for oil exploitation, in which the rotary valve core of the multi-way valve is provided passing through the mounting holes of an upper valve body and a lower valve body and mounted on the upper and lower valve bodies by means of rolling bearings. At high temperatures, the rotary valve core will expand so that the diameter and length of the rotary valve core are greatly increased, especially that the length of the rotary valve core is increased more obviously. The rolling bearing can be installed at a certain axial clearance to compensate for the increase in the length of the rotary valve core, but this compensation is limited, and it only adapts to the situation of the rotary valve core with a small amount of elongation. When the rotary valve core has a relatively large amount of elongation in high temperature environment, the axial clearance of rolling bearings cannot compensate such that the rotary valve core abuts against the rolling bearing, thus the rotation of the rotary valve core is not smooth or even stuck (jammed). In addition, in high temperature and high pressure environment, oil leak phenomenon is prone to occur in a multi-way valve. In order to solve the above problems, the following points need to be considered:

1. Set a reasonable axial clearance of a rotary valve core so as to prevent the rotary valve core from being stuck when rotating due to the above reasons.

2. Use safe and reliable seal to prevent oil leak.

3. The rotary valve core is radial positioned so as to prevent the rotary valve core from adhering to the upper and lower valve bodies or being stuck caused by inconsistent expansion due to the difference between the internal and external temperatures.

SUMMARY OF THE INVENTION

In view of the above technical problems existing in the prior art, the present invention provides a multi-way valve in which a rotary valve core may flexibly rotate in different temperature environments.

In order to solve the above-mentioned technical problems, the technical solution adopted by the present invention is:

A multi-way valve includes an upper valve body, a lower valve body and a rotary valve core, wherein the upper valve body and the lower valve body are respectively provided with a coaxial upper mounting hole and lower mounting hole, an upper end of the rotary valve core passes through and extends out of the upper mounting hole and a lower end of the rotary valve core extends into the lower mounting hole; the rotary valve core located below the upper valve body is formed with a first stepped surface facing toward the upper valve body; an adjusting nut, which is located below the rotary valve core, is provided in the lower mounting hole, and the adjusting nut is threadedly connected to the hole-wall of the lower mounting hole; the rotary valve core is moved up and down by adjusting the adjusting nut such that an axial clearance between the first stepped surface and the upper valve body is adjusted.

Preferably, an upper shaft sleeve is provided between the upper mounting hole and the rotary valve core; a lower shaft sleeve is provided between the lower mounting hole and the rotary valve core.

Preferably, the rotary valve core is formed with a second stepped surface abutting against an upper end of the lower shaft sleeve, a lower end of which protrudes from the lower end of the rotary valve core so that the adjusting nut abuts against the lower end of the lower shaft sleeve.

Preferably, the upper end of the lower shaft sleeve extends outward in a radial direction to form a flange, the two opposite surfaces of which abut with the second stepped surface and an upper outer edge of the lower mounting hole respectively; the flange is provided with a plurality of spacing holes, and the lower valve body is threadedly connected with a plurality of bolts passing through the spacing holes respectively and the radial dimension of the spacing hole is larger than the maximum radial dimension of bolt caps of the bolts.

Preferably, a sealing collar is provided between the lower shaft sleeve and the lower valve body and between the lower shaft sleeve and the rotary valve core.

Preferably, the upper shaft sleeve is provided at a lower portion of the upper valve body, so that the first stepped surface abuts against a lower end of the upper shaft sleeve when the rotary valve core is moved upwardly.

Preferably, an annular gap is formed between the hole-wall of the upper mounting hole located in the upper portion of the upper valve body and the rotary valve core, the annular gap is filled with sealing filler; a pressing sleeve is sleeved on the rotary valve core, with the pressing sleeve pressing against said sealing filler and being pre-strained by fasteners.

Preferably, the middle portion of the rotary valve core is provided with a penetrating first passage; a penetrating second passage opposite to the first passage is provided in the upper valve body; the end of the first passage opposite to the second passage is provided with a valve seat ring; an annular third stepped surface is formed on the inner wall of the first passage; an inner hexagon nut, which is located on the third stepped surface, is provided in the first passage between the valve seat ring and the third stepped surface; a disk spring is provided on the inner hexagon nut, which deforms under the action of the inner hexagon nut to produce an axial force; a thrust ring is provided above the disk spring and it thrusts upward under the action of the disk spring; a sealing ring for sealing the rotary valve core and the valve seat ring is provided between the thrust ring and the valve seat ring.

Compared with the prior art, the multi-way valve according to the present invention has the following advantageous effects:

1. The axial gap between the first stepped surface of the rotary valve core and the upper valve body of the multi-way valve of the present invention is actually the axial clearance of the rotary valve core, hence the axial clearance of the rotary valve core can be adjusted by rotating the adjusting nut. More importantly, when the ambient temperature changes, the axial position of the rotary valve core may be changed by rotating the adjusting nut to compensate the amount of change in the length of the rotary valve core, so that the rotary valve core can always has a reasonable axial clearance, which further makes the rotary valve core flexibly rotate at different temperatures.

2. in a preferred embodiment of the present invention, the rotary valve core is radially positioned by the upper shaft sleeve provided on the upper valve body and the lower shaft sleeve provided on the lower valve body, so that the rotary valve core can withstand a certain radial load, and the upper shaft sleeve and the lower shaft sleeve have simple structures and are easy to install.

3. In a preferred embodiment of the present invention, sealing filler is filled between the upper valve body and the rotary valve core of the multi-way valve, and the sealing filler may effectively prevent the oil liquid in the multi-way valve from leaking from the upper valve body. Such form of sealing is reliable in installation, can use for a long term, and is maintenance-free.

DETAILED DESCRIPTION

The present invention will now be described in detail with reference to the accompanying drawings and specific embodiments in order to provide a better understanding of the technical solutions of the present invention by those skilled in the art.

Figure 1:
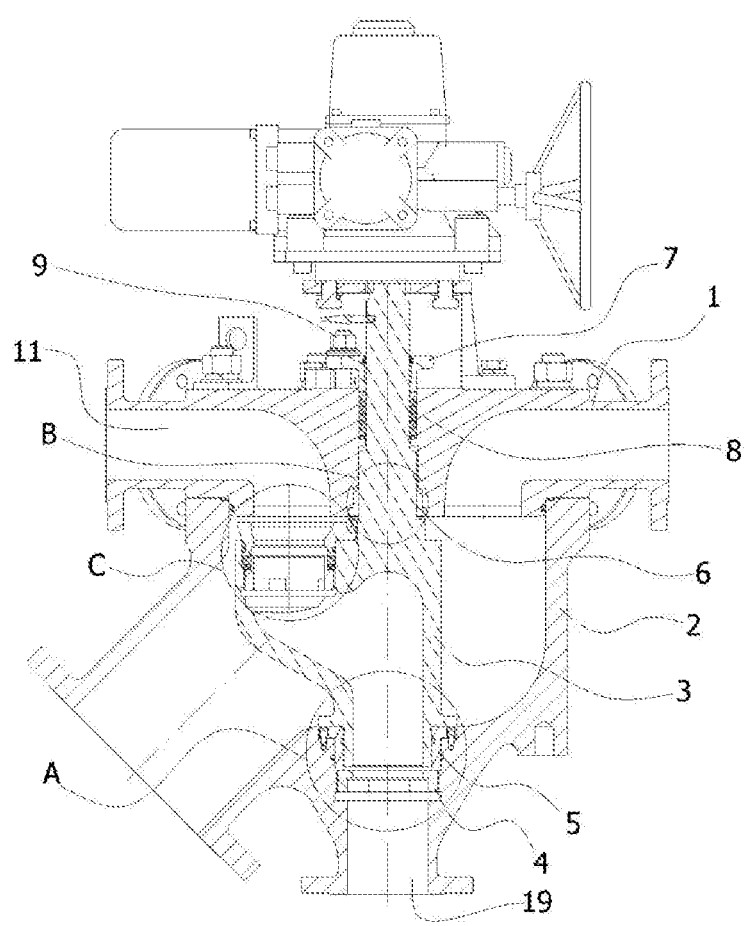
FIG. 1 is a. structural schematic view of a multi-way valve of the present invention.
Figure 2:
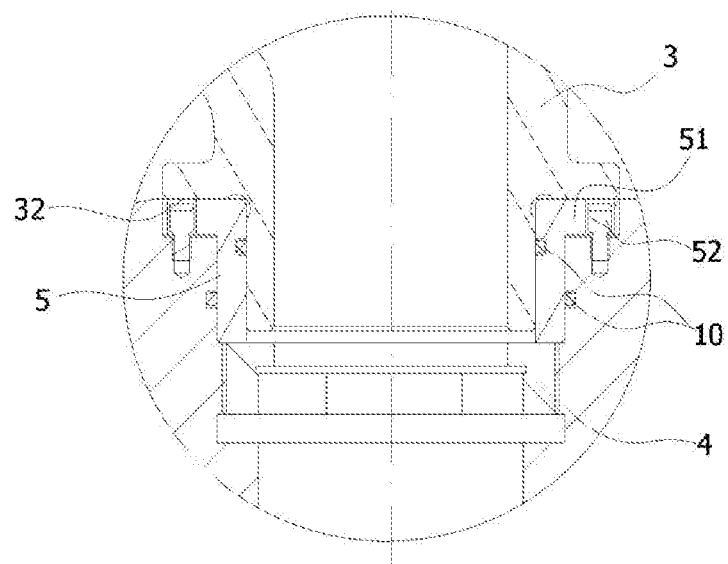
FIG. 2 is an enlarged view of part A of FIG. 1.
Figure 3:
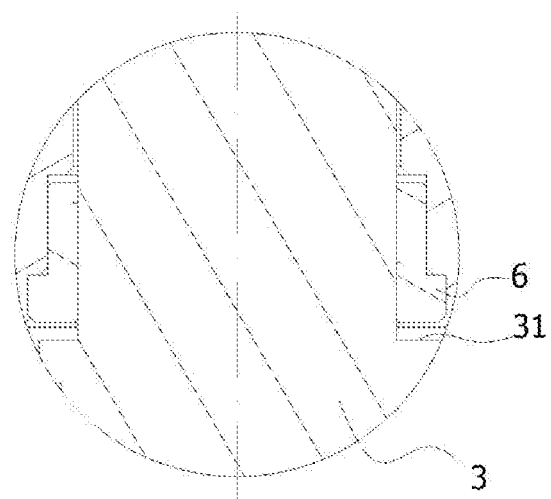
FIG. 3 is an enlarged view of part B of FIG. 1.

As shown in FIGS. 1 to 3, an embodiment of the present invention provides a multi-way valve for use in a high-temperature and high-pressure oil exploitation environment, including an upper valve body 1, a lower valve body 2 and a rotary valve core 3. The upper valve body 1 and the lower valve body 2 are mounted together, and the upper valve body 1 and the lower valve body 2 therebetween are sealed by a sealing structure or a sealing member. The upper valve body 1 is provided with an upper mounting hole. The lower valve body 2 is provided with a lower mounting hole coaxial with the upper mounting hole. A metering port 19 is provided in the lower valve body 2, and the metering port 19 is located below the lower mounting hole penetrating to the lower mounting hole. The rotary valve core 3 is provided passing through the upper mounting hole of the upper valve body 1 and the lower mounting hole of the lower valve body 2, and the upper end of the rotary valve core 3 extends out of the upper valve body 1 and the lower end thereof extends into a section of the lower mounting hole of the lower valve body 2; An adjusting nut 4 is provided in the lower mounting hole where the rotary valve core 3 does not extend into, abutting against the lower end of the rotary valve core 3, and the adjusting nut 4 is an inner hexagon nut having an outer thread on its outer circumference, the adjusting nut 4 is threadedly connected to the lower mounting hole; an annular first stepped surface 31 towards the upper valve body 1 is formed on the rotary valve core 3 near the lower end of the upper valve body 1, the rotary valve core 3 corresponds to a stepped shaft having a shaft shoulder, and the first stepped surface 31 corresponds to the shaft shoulder of the stepped shaft. In this way, the adjustment nut 4 is adjusted by using a special tool extending from the metering port 19 inwards, to move the rotary valve core 3 up and down, so as to adjust the axial clearance between the first stepped surface 31 and the upper valve body 1.

As can be seen from the above, the axial gap between the first stepped surface 31 and the upper valve body 1 is actually the axial clearance of the rotary valve core 3, that is, the axial play amount of the rotary valve core 3 is equal to the amount of the axial gap of the upper valve body 2. By rotating the adjusting nut 4 to compensate for the different amounts of elongation of the rotary valve core 3 due to different temperatures, so that the rotary valve core 3 at different temperatures always has a reasonable axial clearance, thus the rotary valve core 3 is able to rotate flexibly at different temperatures.

The axial clearance of the rotary valve core 3 of the multi-way valve of the present invention is adjustable and the adjustment range is relatively large, hence the rotary valve core 3 can be flexibly rotated in a relative large temperature range, particularly in a high temperature environment, by rotating the adjusting nut 4, the rotary valve core 3 would not be stuck due to its excessive elongation amount.

In order to achieve the radial positioning of the rotary valve core 3, in a preferred embodiment of the present invention, as shown in FIGS. 1 to 3, an upper shaft sleeve 6 is provided between the upper mounting hole and the rotary valve core 3, a lower shaft sleeve 5 is provided between the lower mounting hole and the rotary valve core 3, and the upper shaft sleeve 6 is in interference fit with the upper valve body 1 and the upper shaft sleeve 6 is in clearance fit with the rotary valve core 3, so as to prevent the upper shaft sleeve 6 from rotating together with the rotary valve core 3. The hardness of the upper shaft sleeve 6 and the lower shaft sleeve 5 is smaller than that of the rotary valve core 3, so that the amount of wear of the rotary valve core 3 is smaller than the amount of wear of the upper shaft sleeve 6 and the lower shaft sleeve 5 and prevents the upper shaft sleeve 6 and the lower shaft sleeve 5 from scratching the surface of the rotary valve core 3 when the rotary valve core 3 is rotating. More importantly, if the rotary valve core 3 has the same hardness as the upper shaft sleeve 6 and the lower shaft sleeve 5, the rotary valve core 3 is prone to be stuck, while the rotation of the rotary valve core 3 is more flexible if it has a hardness difference from the upper shaft sleeve 6 and the lower shaft sleeve 5 and thus a stuck of the valve core 3 can be effectively prevented. Preferably, the difference between the hardness of the rotary valve core 3 and that of the upper shaft sleeve 6 and the lower shaft sleeve 5 is HRC5~HRC6. In the present embodiment, the rotary valve core 3 is formed with a second stepped surface 32 which abuts against the upper end of the lower shaft sleeve 5, and the lower end of the lower shaft sleeve 5 protrudes from the lower end of the rotary valve core 3 and abuts against the adjusting nut 4. The upper shaft sleeve 6 is provided at the lower portion of the upper valve body 1, and the specific position of the upper shaft sleeve 6 is configured that the first stepped surface 31 abuts against the lower end of the upper shaft sleeve 6 when the rotary valve core 3 moves upward. In this way, the adjusting nut 4 moves the rotary valve core 3 up and down by pushing against the lower shaft sleeve 5 to prevent resistance to rotation of the rotary valve core 3 due to the direct abutment of the adjusting nut 4 against the rotary valve core 3. And since the rotary valve core 3, after its upward movement, abuts against the upper shaft sleeve 6 instead of abutting against the lower end of the upper valve body 1, the lower end of the upper valve body 1 does not need to be processed and the processing cost is saved.

In order to prevent the lower shaft sleeve 5 from rotating together with the rotary valve core 3, in a preferred embodiment of the present invention, the upper end of the lower shaft sleeve 5 extends outward in a radial direction to form a flange 51, as shown in FIGS. 1 and 2. The opposite surfaces of the flange 51 abut against the second stepped surface 32 and the upper outer edge of the lower mounting hole respectively; the flange 51 is provided with a plurality of spacing holes, and the lower valve body 2 is threadedly connected with a plurality of bolts 52, which pass through the spacing holes, respectively. And the radial dimension of the spacing hole is larger than the maximum radial dimension of the bolt caps of the bolts 52. In this way, the lower shaft sleeve 5 will not rotate together with the rotary valve core 3 thanks to the restriction of the bolts 52. In order to prevent the oil liquid in the multi-way valve from leaking from the gap between the lower shaft sleeve 5 and the lower valve body 2 and the gap between the lower shaft sleeve 5 and the rotary valve core 3, in the present embodiment, a sealing collar 10 is provided both between the lower shaft sleeve 5 and the lower valve body 2 and between the lower shaft sleeve 5 and the rotary valve core 3.

It is needed to form a seal between the upper valve body 1 and the rotary valve core 3 in order to prevent the oil liquid in the multi-way valve from leaking from the gap between the upper valve body 1 and the rotary valve core 3. Specifically, a counterbore is formed in the upper end of the upper mounting hole, the hole-wall of which forms an annular gap with the rotary valve core 3. The sealing filler 8 (the material of the sealing filler 8 may be graphite) is filled in the annular gap, the pressing sleeve 7 sleeved on the rotary valve core 3 is pressed against the sealing filler 8 and is pre-strained by fasteners so that the pressing sleeve 7 always maintains a certain pressure on the sealing filler 8. The fasteners in the present embodiment are the bolt, which is threadedly connected to the upper end surface of the upper valve body 1, and the nut 9 sleeved on the bolt. The pressure of the pressing sleeve 7 against the sealing filler 8 is adjusted by rotating the nut 9, thus making the sealing filler 8 can make efficient sealing at different temperatures and intensities of pressure.

Figure 4:
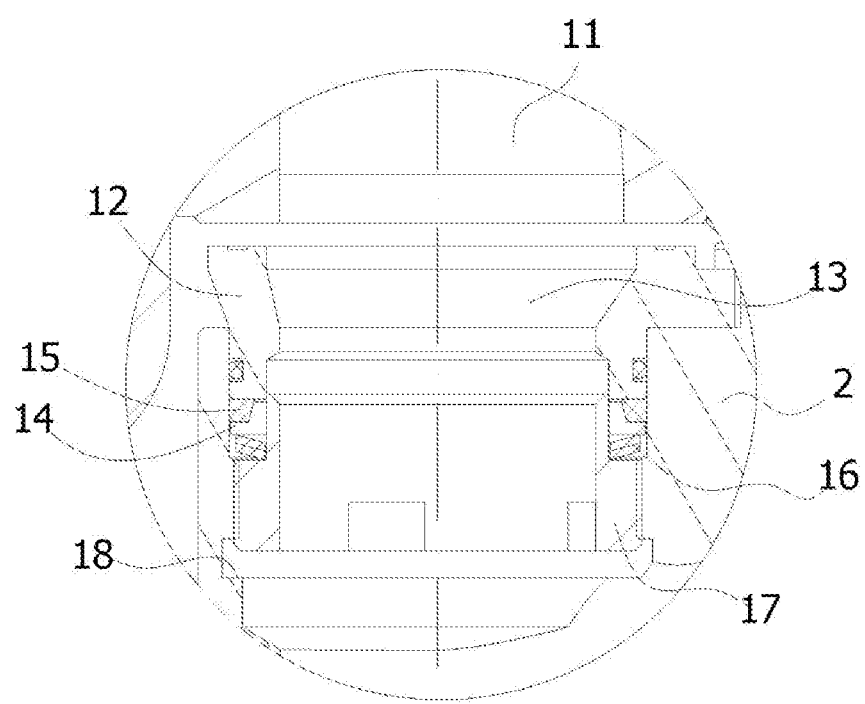
FIG. 4 is an enlarged view of part C of FIG. 1.
In the figures:
1—upper valve body; 2—lower valve body; 3—rotary valve core; 31—first stepped surface; 32—second stepped surface; 4—adjusting nut; 5—lower shaft sleeve; 51—flange; 52—bolt; 6—upper shaft sleeve; 7—pressing sleeve; 8—sealing filler; 9—nut; 10—sealing collar; 11—second passage; 12—valve seat ring; 13 first passage; 14—thrust ring; 15 sealing ring; 16—disk spring; 17—inner hexagon nut; 18—third stepped surface; 19—metering port.

In a preferred embodiment of the present invention, as shown in FIGS. 1 and 4, the middle portion of the rotary valve core 3 is provided with a penetrating first passage 13, one end of which communicates with the metering port 19. A second passage 11, which is penetrating and opposed to the other end of the first passage 13, is provided within the upper valve body 11. A valve seat ring 12 is provided in the end of the first passage 13 opposite to the second passage 11. In order to realize the sealing between the rotary valve core 3 and the valve seat ring 12, the following seal structure is adopted: a third stepped surface 18 is firmed on the inner wall of the first passage 13; an inner hexagon nut 17, which is provided on the third stepped surface 18, is provided in the first passage 13 between the valve seat ring 12 and the third stepped surface 18. The inner hexagon nut 17 includes two cylindrical portions having different outer diameters, one end that has a bigger outer diameter is located on the third stepped surface 18 and the other end having a smaller outer diameter faces toward the valve seat ring 12. The cylindrical portion having a smaller outer diameter is sleeved with a disk spring 16 outside. A thrust ring 14 is provided on the disk ring 16, and a sealing ring 15 is provided between the thrust ring 14 and the inner wall of the first passage 13.

Before the multi-way valve operates in high temperature and high pressure environment, the adjusting nut 4 is rotated counterclockwise by a special tool so that it is rotated by 70° –90°, so that the axial clearance of the rotary valve core 3 maintains at 0.58 mm-0.75 mm. In this way, when the multi-way valve operates at high temperature and high pressure, the rotary valve core 3 has enough axial clearance for its own flexible rotation after thermal expansion.

In summary, the advantages of the multi-way valve of the present invention are:

1 The axial gap between the first stepped surface 31 of the rotary valve core 3 and the upper valve body 1 of the multi-way valve of the present invention is actually the axial clearance of the rotary valve core, hence the axial clearance of the rotary valve core 3 can be adjusted by rotating the adjusting nut 4. More importantly, when the ambient temperature changes, the axial position of the rotary valve core 3 may be changed by rotating the adjusting nut 4 to compensate the amount of change in the length of the rotary valve core 3, so that the rotary valve core 3 can always has a reasonable axial clearance, which further makes the rotary valve core 3 flexibly rotate at different temperatures.

2. In a preferred embodiment of the present invention, the rotary valve core 3 is radially positioned by the upper valve sleeve 6 provided on the upper valve body 1 and the lower valve sleeve 5 provided on the lower valve body 2, so that the rotary valve core 3 can withstand a certain radial load, and the upper valve sleeve 6 and the lower valve sleeve 5 have simple structures, easy to install.

3. In a preferred embodiment of the present invention, sealing filler 8 is filled between the upper valve body 1 and the rotary valve core 3 of the multi-way valve, and the sealing filler 8 is effective in preventing the oil in the multi-way valve from leaking from the upper valve body 1. Such form of sealing is reliable in installation, can use for a long term, and is maintenance-free.

The above embodiments are only exemplary embodiments of the present invention, and are not used for limiting the present invention. The protection scope of the present invention is defined by the claims. A person skilled in the art may make various modifications or equivalent substitutions to the present invention within its essence and protection scope, and said modifications or equivalent substitutions should be regarded as falling in the protection scope of the present invention.

The invention claimed is:

1. A multi-way valve comprising:
   an upper valve body;
   a lower valve body; and
   a rotary valve core,
   wherein the upper valve body and the lower valve body each comprise a coaxial upper mounting hole and lower mounting hole, an upper end of the rotary valve core passing through and protruding from the upper mounting hole, and a lower end of the rotary valve core extending into the lower mounting hole;

wherein the rotary valve core, which is located below the upper valve body, is formed with a first stepped surface facing toward the upper valve body; an adjusting nut, which is located below the rotary valve core, is provided in the lower mounting hole, the adjusting nut being threadedly connected to a hole-wall of the lower mounting hole; and the rotary valve core is moved up and down axially by adjusting the adjusting nut such that an axial clearance between the first stepped surface and the upper valve body is adjusted, wherein a metering port is provided in the lower valve body below the adjusting nut, and wherein the adjusting nut is configured to adjust the axial clearance via the metering port after the multi-way valve is assembled.

2. The multi-way valve according to claim 1, wherein an upper shaft sleeve is provided between the upper mounting hole and the rotary valve core, and a lower shaft sleeve is provided between the lower mounting hole and the rotary valve core.

3. The multi-way valve according to claim 2, wherein the rotary valve core is formed with a second stepped surface abutting against an upper end of the lower shaft sleeve, a lower end of which protrudes from the lower end of the rotary valve core so that the adjusting nut abuts against the lower end of the lower shaft sleeve.

4. The multi-way valve according to claim 3, wherein the upper end of the lower shaft sleeve extends outward in a radial direction to form a flange, opposite surfaces of which abut against the second stepped surface and an upper outer edge of the lower mounting hole respectively; the flange is provided with a plurality of spacing holes, and the lower valve body is threadedly connected with a plurality of bolts respectively passing through the spacing holes, and a radial dimension of the spacing hole is larger than a maximum radial dimension of bolt caps of the bolts.

5. The multi-way valve according to claim 4, wherein a sealing collar is provided both between the lower shaft sleeve and the lower valve body and between the lower shaft sleeve and the rotary valve core.

6. The multi-way valve according to claim 2, wherein the upper shaft sleeve is mounted and provided in a lower portion of the upper valve body so that the first stepped surface abuts against a lower end of the upper shaft sleeve when the rotary valve core is moved upwardly.

7. The multi-way valve according to claim 6, wherein an annular gap is formed between a hole-wall of the upper mounting hole located in an upper portion of the upper valve body and the rotary valve core, the annular gap being filled with sealing filler; a pressing sleeve is sleeved on the rotary valve core, the pressing sleeve pressing against the sealing filler and being pre-strained by fasteners.

8. The multi-way valve according to claim 7, wherein a middle portion of the rotary valve core is provided with a penetrating first passage; a penetrating second passage opposite to the first passage is provided in the upper valve body; an end of the first passage opposite to the second passage is provided with a valve seat ring; an annular third stepped surface is formed on an inner wall of the first passage; an inner hexagon nut, which is located on the third stepped surface, is provided in the first passage between the valve seat ring and the third stepped surface; a disk spring is provided on the inner hexagon nut, which deforms under an action of the inner hexagon nut to produce an axial force; a thrust ring is provided above the disk spring and thrusts upward under an action of the disk spring; a sealing ring for sealing the rotary valve core and the valve seat ring is provided between the thrust ring and the valve seat ring.

* * * * *